United States Patent
Greulich

(10) Patent No.: US 10,597,061 B2
(45) Date of Patent: Mar. 24, 2020

(54) MOUNTING ARRANGEMENT FOR A STEERING COLUMN OF A VEHICLE AND VEHICLE WITH A MOUNTING ARRANGEMENT OF THIS TYPE

(71) Applicant: Volkswagen Aktiengesellschaft, Wolfsburg (DE)

(72) Inventor: Sebastian Greulich, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 16/266,697

(22) Filed: Feb. 4, 2019

(65) Prior Publication Data

US 2019/0168797 A1 Jun. 6, 2019

Related U.S. Application Data

(63) Continuation of application No. PCT/EP2017/065421, filed on Jun. 22, 2017.

(30) Foreign Application Priority Data

Aug. 4, 2016 (DE) ........................ 10 2016 214 463

(51) Int. Cl.
 *B62D 1/16* (2006.01)
 *B62D 25/08* (2006.01)
 *B62D 25/14* (2006.01)

(52) U.S. Cl.
 CPC ............. *B62D 1/16* (2013.01); *B62D 25/081* (2013.01); *B62D 25/145* (2013.01)

(58) Field of Classification Search
 CPC ....... B62D 1/16; B62D 25/081; B62D 25/145
 See application file for complete search history.

(56) References Cited

U.S. PATENT DOCUMENTS

| | | | |
|---|---|---|---|
| 4,362,319 A | 12/1982 | Masaki et al. | |
| 5,810,393 A | * 9/1998 | Joest ................... | B62D 25/145 280/750 |

(Continued)

FOREIGN PATENT DOCUMENTS

| | | |
|---|---|---|
| DE | 3624747 A1 | 2/1988 |
| DE | 19501859 A1 | 7/1996 |

(Continued)

OTHER PUBLICATIONS

International Search Report dated Oct. 25, 2017 in corresponding application PCT/EP2017/065421.

*Primary Examiner* — Darlene P Condra
(74) *Attorney, Agent, or Firm* — Muncy, Geissler, Olds & Lowe, P.C.

(57) ABSTRACT

A bearing arrangement for a steering column of a vehicle, in particular a motor vehicle, is provided, among other things, comprising a cross member running within a vehicle interior of the vehicle as well as having a bulkhead part disposed in front of the cross member, viewed in the direction of travel of the vehicle, a cross member support strut being provided, which supports the cross member on the bulkhead part, and the steering column being firstly supported on the cross member and secondly on the bulkhead part with the aid of a steering column support strut. A reinforcing part is fastened to the bulkhead part on the interior side of the vehicle, and both the cross member support strut and the steering column support strut re supported on the bulkhead part with the aid of the reinforcing part.

11 Claims, 3 Drawing Sheets

(56) References Cited

U.S. PATENT DOCUMENTS

| | | | |
|---|---|---|---|
| 5,957,498 A * | 9/1999 | Holland | B62D 25/14 |
| | | | 180/90 |
| 6,276,483 B1 | 8/2001 | Sinnhuber et al. | |
| 6,276,739 B1 * | 8/2001 | Wich | B62D 25/145 |
| | | | 296/72 |
| 7,344,158 B2 | 3/2008 | Lee et al. | |
| 7,546,893 B2 | 6/2009 | Rahmstorf et al. | |
| 2006/0191737 A1 * | 8/2006 | Kobayashi | B62D 1/16 |
| | | | 180/444 |
| 2016/0214650 A1 * | 7/2016 | Ideguchi | B62D 25/145 |

FOREIGN PATENT DOCUMENTS

| | | |
|---|---|---|
| DE | 10029814 A1 | 1/2002 |
| DE | 10036397 A1 | 2/2002 |
| DE | 10200890 A1 | 7/2003 |
| DE | 10221950 A1 | 11/2003 |
| DE | 10260523 A1 | 7/2004 |
| DE | 10352224 A1 | 6/2005 |
| DE | 102004051182 A1 | 6/2005 |
| EP | 0589299 A1 | 3/1994 |

* cited by examiner

MOUNTING ARRANGEMENT FOR A STEERING COLUMN OF A VEHICLE AND VEHICLE WITH A MOUNTING ARRANGEMENT OF THIS TYPE

This nonprovisional application is a continuation of International Application No. PCT/EP2017/065421, which was filed on Jun. 22, 2017, and which claims priority to German Patent Application No. 10 2016 214 463.4, which was filed in Germany on Aug. 4, 2016, and which are both herein incorporated by reference:

BACKGROUND OF THE INVENTION

Field of the Invention

The present invention relates to a bearing arrangement and a vehicle, in particular a motor vehicle, which includes a bearing arrangement.

Description of the Background Art

For the purposes of the following description, the normal direction of travel of a motor vehicle is designated by "−x" ("minus x"), the direction opposite its normal direction of travel is designated by "+x" ("plus x"), the direction on the horizontal transversely to the x direction, starting from the normal direction of travel (−x) and viewed to the right, is designated by "+y", the direction on the horizontal transversely to the x direction, starting from the normal direction of travel (−x) and viewed to the left, is designated by "−y", the direction on the vertical transversely to the x direction, viewed upwardly, is designated by "+z", and the direction on the vertical transversely to the x direction, viewed downwardly, is designated by "−z." This way of designating the spatial directions in terms of Cartesian coordinates corresponds to the coordinate system generally used in the automotive industry. Moreover, terms such as "front," "rear," "up," "down," and terms of a similar meaning, including the terms "right" and "left," are used in the same manner as they are normally used for designating direction on a motor vehicle.

A steering column is known from DE 102 60 523 A1, which is incorporated herein by reference, and which is essentially made up of a steering shaft housing and a sheering shaft rotatably mounted thereon and supported on the vehicle body. To minimize the tendency of the steering column to vibrate, the latter is supported on the vehicle body with the aid of a so-called steering mount. For this purpose, the steering mount has two brackets on its axial end sections, which, in turn, form adjusting devices. They permit a change in the angle of inclination as well as the axial position of the steering column with respect to a longitudinal axis thereof. The upper end section of the steering mount is fastened directly to the vehicle body, while the lower end section is supported on the vehicle body via two struts.

DE 102 00 890 A1, which is incorporated herein by reference, describes a steering arrangement for a vehicle, in particular for a motor vehicle, comprising a cross member, to which a steering column is fixable with the aid of a steering column receptacle. To avoid, however at least to reduce, a so-called steering wheel jitter, a cross member support strut is firstly provided, which is connectable to the cross member at one end. Secondly, a steering column support strut is provided, which is connectable to the steering column at one end. The cross member support strut and the steering column support strut are each connected at the other end to a bulkhead part at a common connecting point.

Bearing arrangements for a steering column of a vehicle are furthermore known from DE 100 29 814 A1, from DE 103 52 224 A1 and from DE 10 2004 051 182 A1, which corresponds to U.S. Pat. No. 7,344,158.

SUMMARY OF THE INVENTION

It is therefore an object of the present invention to provide an alternative bearing arrangement for a steering column, with the aid of which vibrations in a steering wheel connected to the steering shaft are effectively mitigated. An object of the invention is furthermore to provide a vehicle, in particular a motor vehicle, which includes a bearing arrangement of this type.

Based on a bearing arrangement for a steering column of a vehicle, in particular a motor vehicle, which includes a cross member running within a vehicle interior of the vehicle, as well as including a bulkhead part disposed in front of the cross member, viewed in the direction of travel of the vehicle, a cross member support strut being provided, which supports the cross member on the aforementioned bulkhead part, and the steering column being firstly supported by cross member and secondly on the bulkhead part with the aid of a steering column support strut, the presented object is achieved in that a reinforcing part is fastened to the bulkhead part on the interior side of the vehicle, and both the cross member support strut and the steering column support strut are supported on the bulkhead part with the aid of the aforementioned reinforcing part.

Due to this measure, the stiffness of the connecting point of the support strut on the bulkhead part is advantageously increased, which results in a particularly low-vibration bearing of the steering column.

The aforementioned bulkhead part can be formed by a windshield cowl, which is already designed to be relatively stiff per se. A windshield cowl is generally understood to be a component on a vehicle, in particular on a motor vehicle, which bridges a gap between a hood and a windshield or windscreen. The windshield cowl is used, among other things, to collect and remove rainwater draining from the windshield. The aforementioned cross member is preferably disposed to run below the windshield of the vehicle. If the aforementioned windshield cowl is fixedly connected to the bulkhead, in that the latter extends a bulkhead of the vehicle in the upward direction of the vehicle—hence in the vehicle vertical direction (+z direction)—or if the bulkhead itself forms or co-forms the windshield cowl, the bearing arrangement according to the invention is deemed to be particularly stiff.

The cross member support strut and the steering column support strut can have at least one common fastening point on the reinforcing part, which also results in savings in material as well as manufacturing and assembly time while retaining the advantages of the prior art, namely that forces acting upon the aforementioned common fastening point cancel each other out. As is also provided by the invention, the cross member support strut is supported on the reinforcing part via the steering column support strut in that the steering column support strut is disposed between the reinforcing part and the cross member support strut at the common fastening point. Due to this measure, the assembly of the components the bearing arrangement under discussion and essential to the invention as well as the arrangement and centering thereof in relation to each other are facilitated.

The cross member support strut can be formed by a hollow profile, which extends in the direction of travel or the vehicle longitudinal direction (X direction) and includes a connecting flange on the reinforcing part side. A particularly stiff connection of the cross member to the vehicle bodywork or vehicle body is implemented with the aid of the aforementioned cross member, while minimizing the weight of the vehicle. Insofar, it is provided according to a preferred specific embodiment that the hollow profile is formed by a first upper hollow profile section having a downwardly open U profile cross-section as well as by a second lower hollow profile section having an upwardly open U profile cross-section, the hollow profile sections being fixedly connected to each other and forming a closed hollow profile, viewed in cross-section. A hollow profile of this type may be easily and cost-effectively manufactured and mounted.

As far as the steering column support strut is concerned, the latter has a first strut section which runs upwardly at an angle toward the front of the vehicle, at least in sections, starting from the steering column, and which transitions into a second strut section, which is formed by a fastening flange of the steering column support strut for connecting the latter to the reinforcing part. Due to this measure, the forces acting upon the steering column are effectively introduced into the supporting structure of the vehicle. In a refinement of the invention, a kink is provided in the first strut section, which advantageously affects the movement behavior of the steering column as a target bending point in the case of a crash event.

To support and fasten the steering column on the cross member, two fastening points arranged next to each other, viewed in the vehicle transverse direction (Y direction), are preferably provided, which are furthermore preferably spaced a distance apart, thereby resulting in a particularly stiff connection of the steering column to the cross member.

The reinforcing part can be formed by a hollow profile, which ensures the desired high stiffness of the bearing arrangement while saving material and weight. The hollow profile is preferably formed by a U profile, viewed in cross-section, which, together with the bulkhead part, forms a closed hollow profile, viewed in cross-section.

The invention also relates to a vehicle, in particular a motor vehicle, which includes a bearing arrangement of the type mentioned above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
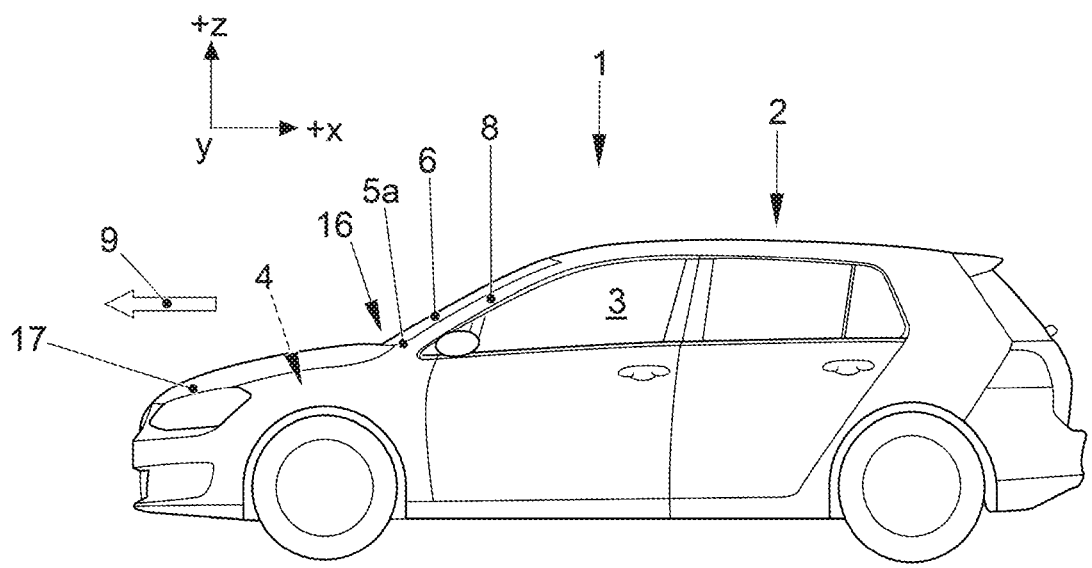
FIG. 1 shows a highly schematic representation of a vehicle, a motor vehicle in the present case, which is equipped with a bearing arrangement according to the invention for a steering column of the vehicle.

Vehicle 1 (motor vehicle) illustrated in FIG. 1 includes a vehicle body 2, which, in turn, forms a vehicle interior 3 and an engine compartment 4 situated at the front of the vehicle. Vehicle interior 3 and engine compartment 4 are separated from each other with the aid of a front bulkhead 5 illustrated in FIG. 2. A cross member 7 running in the vehicle transverse direction (Y direction), which is supported at both ends on front body columns 8 (A columns) of vehicle 1 illustrated in FIG. 1 and fastened thereto, is disposed in aforementioned vehicle interior 3 below a windshield 6 or windscreen of vehicle 1 illustrated in FIG. 1. Front bulkhead 5 is thus disposed in front of cross member 7, viewed in direction of travel 9 of vehicle 1. According to this exemplary embodiment, aforementioned cross member 7 is furthermore supported on a central tunnel of vehicle body 2, with the aid of assigned support elements 10.

Figure 2:
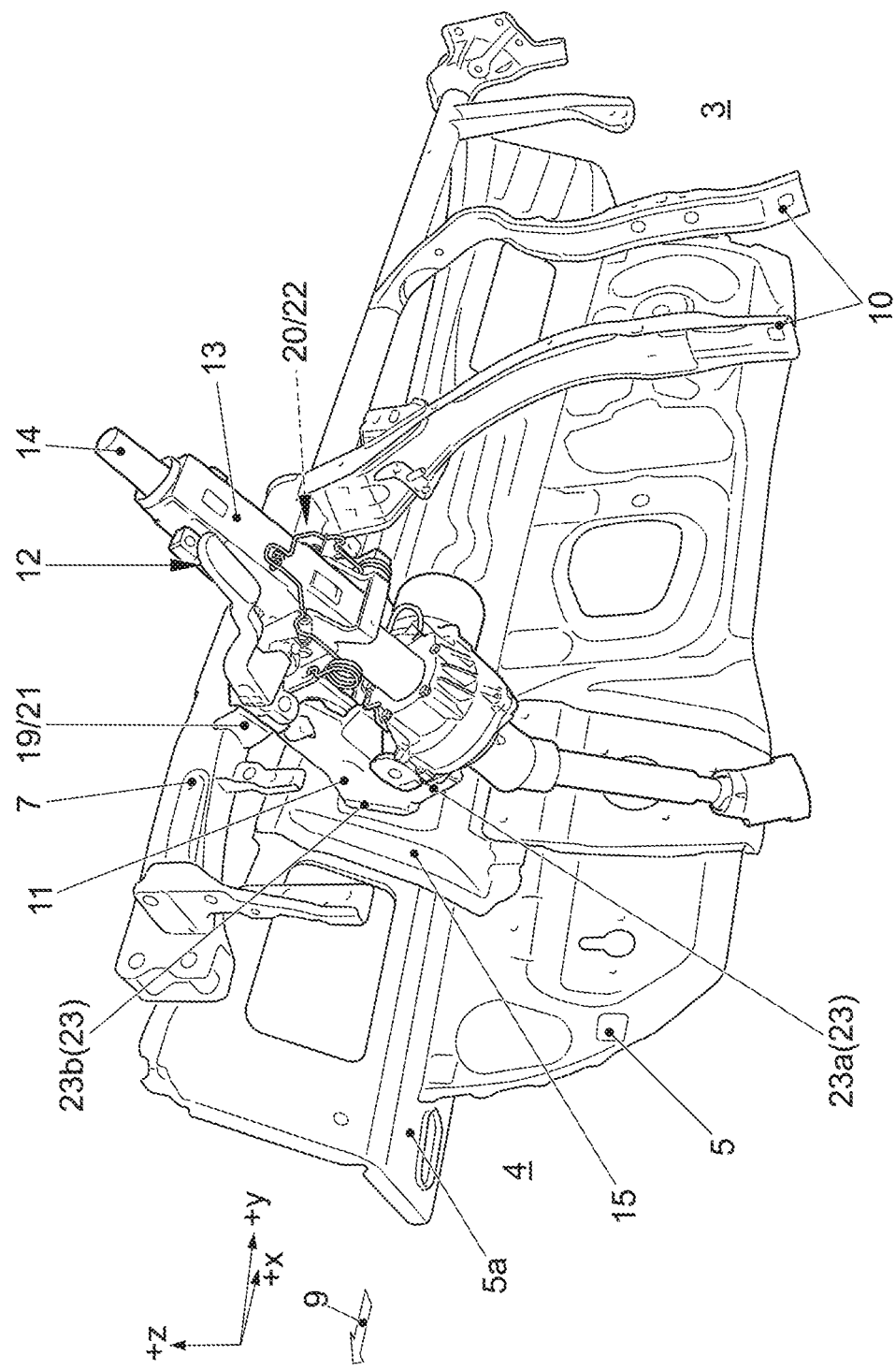
FIG. 2 shows a perspective partial view of the body shell of the motor vehicle from FIG. 1, together with the aforementioned steering column mounted according to the invention, as well as with a view of a bulkhead, including the windshield cowl of the vehicle.

As is furthermore apparent in FIG. 2, a bulkhead part 5a, in the form of a windshield cowl, abuts bulkhead 5 in the upward direction of the vehicle, hence in the vehicle vertical direction (Z direction), whereby bulkhead 5 is, so to speak, designed to be extended in the upward direction. Aforementioned bulkhead part 5a and bulkhead 5 are preferably made from steel and are integrally joined to each other by means of welding. Cross member 7 is also supported on aforementioned bulkhead part 5a with the aid of a cross member support strut 11 running in the vehicle longitudinal direction (X direction).

In addition, FIG. 2 shows a steering column 12, including a steering shaft housing 13, and a steering shaft 14, which is rotatably mounted therein and which carries a steering wheel on its end on the interior side of the vehicle. With the aid of a force transmission, which penetrates front bulkhead 5 through a suitable opening or through-hole therein, aforementioned steering shaft 14 is operatively connected on the other end to a steering mechanism disposed within engine compartment 4.

Figure 3:
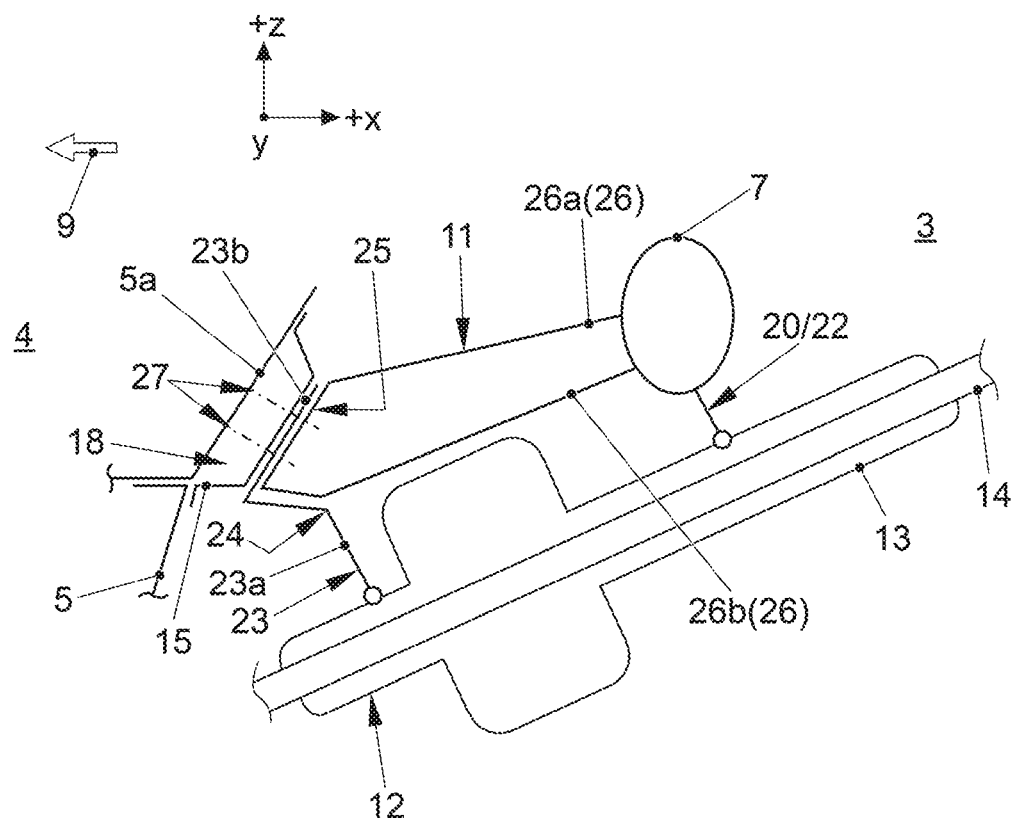
FIG. 3 shows a highly schematic sectional representation of the bearing arrangement according to the invention.
Figure 4:
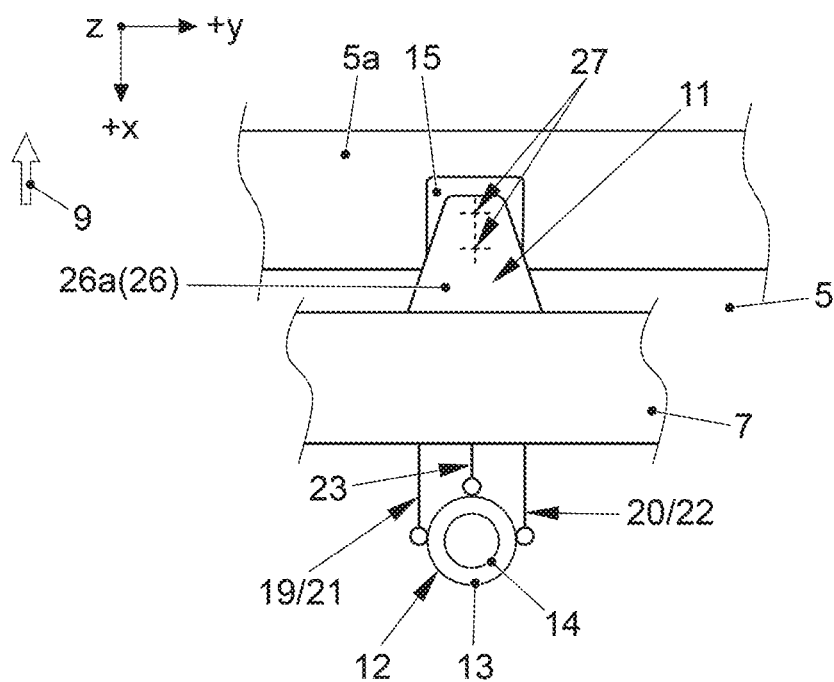
FIG. 4 shows a top view of the bearing arrangement according to FIG. 3.

As is apparent in FIGS. 2 through 4, bulkhead part 5a in the form of the windshield cowl has a reinforcing part 15 on the interior side of the vehicle, which is fastened to bulkhead part 5a, i.e. windshield cowl. As explained above, the windshield cowl bridges a gap, provided with reference numeral 16 in FIG. 1, between a hood 17 and windshield 6 of vehicle 1. As is furthermore apparent, in particular, in FIGS. 3 and 4, reinforcing part 15 is formed by a hollow profile in the form of a U profile, viewed in cross-section, which forms a closed hollow profile 18 together with bulkhead part 5a, viewed in cross-section. Reinforcing part 15 is also preferably made from steel and is furthermore also preferably integrally connected to bulkhead part 5a by means of welding.

Moreover, it is apparent from FIGS. 3 and 4 that steering column 12, in an upper section thereof, is connected approximately directly to cross member 7 with the aid of two fastening points 19, 20 disposed at a distance from each other, viewed in the vehicle transverse direction (Y direction). Fastening points 19, 20 in the present case are formed by bearing blocks 21, 22 (cf. in particular FIG. 2), which implement a largely rigid connection between steering column 12, i.e. steering shaft housing 13 thereof, and cross member 7.

In a lower section of steering column 12, the latter has a steering column support strut 23, which includes a first strut section 23a, which, according to a first design variant of the invention shown in FIG. 2, runs upwardly at an angle toward the front of the vehicle, starting from steering column 12 or its steering shaft housing 13, and transitions into a second strut section 23b and is formed by an angled fastening flange for connecting steering column support strut 23 to reinforcing part 15. In contrast, FIG. 3 shows a second design variant of steering column support strut 23, according to which first strut section 23a additionally has a kink 24, which affects the movement behavior of steering column 12 as a target bending point in the case of a crash event.

Second strut section 23b of steering column support strut 23, which is designed as a fastening flange, is supported directly on reinforcing part 15 on the interior side of the vehicle. Cross member support strut 11, in turn, is supported on reinforcing part 15 by a connecting flange 25 on the reinforcing part side via aforementioned second strut section 23b. Aforementioned connecting flange 25 represents, so to speak, a closing flange of a hollow profile 26 forming cross member support strut 11. In the present case, this hollow profile 26 is formed by a first upper hollow profile section 26a having a downwardly open U profile cross-section, which extends in the vehicle longitudinal direction (X direction), and a second lower hollow profile section 26b having an upwardly open U profile cross-section, which extends in the vehicle longitudinal direction (X direction). Hollow profile sections 26a, 26b are fixedly connected to each other by means of welding and thus form a closed hollow profile 26, viewed in cross-section.

Cross member support strut 11 and steering column support strut 23 have a common fastening point 27 on reinforcing part 15, which in the present case are formed by two highly schematically illustrated screw points disposed one above the other, each having bores arranged coaxially one after the other in reinforcing part 15 in second strut section 23b of steering column strut 23 designed as a fastening flange and bores arranged on connecting flange 25 of cross member support strut 11, each of which is penetrated by a fastening screw.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A bearing arrangement for a steering column of a vehicle, the bearing arrangement comprising:
   a cross member running within a vehicle interior of the vehicle;
   a bulkhead part disposed in front of the cross member, viewed in a direction of travel of the vehicle;
   a cross member support strut, which supports the cross member on the bulkhead part;
   the steering column, which is supported on the cross member and supported on the bulkhead part with the aid of a steering column support strut; and
   a reinforcing part fastened to the bulkhead part on an interior side of the vehicle,
   wherein the cross member support strut and the steering column support strut are supported on the bulkhead part via the reinforcing part,
   wherein the cross member support strut and the steering column support strut have at least one common fastening point on the reinforcing part, and
   wherein the cross member support strut is supported on the reinforcing part via the steering column support strut.

2. The bearing arrangement according to the claim 1, wherein the bulkhead part is formed by a windshield cowl.

3. The bearing arrangement according to the claim 1, wherein the cross member support strut is formed by a hollow profile, which extends in the direction of travel or the vehicle longitudinal direction and includes a connecting flange on the reinforcing part side.

4. The bearing arrangement according to the claim 3, wherein the hollow profile is formed by a first upper hollow profile section having a downwardly open U profile cross-section and by a second lower hollow profile section having an upwardly open U profile cross-section, the first and second hollow profile sections being fixedly connected to each other and forming a closed hollow profile viewed in cross-section.

5. The bearing arrangement according to the claim 1, wherein two fastening points are disposed next to each other, viewed in a vehicle transverse direction, and are provided for supporting and fastening the steering column on the cross member.

6. The bearing arrangement according to the claim 5, wherein the fastening points are spaced a distance apart.

7. A vehicle comprising a bearing arrangement according to claim 1.

8. A bearing arrangement for a steering column of a vehicle, the bearing arrangement comprising:
   a cross member running within a vehicle interior of the vehicle;
   a bulkhead part disposed in front of the cross member, viewed in a direction of travel of the vehicle;
   a cross member support strut, which supports the cross member on the bulkhead part;
   the steering column, which is supported on the cross member and supported on the bulkhead part with the aid of a steering column support strut; and
   a reinforcing part fastened to the bulkhead part on an interior side of the vehicle,
   wherein the cross member support strut and the steering column support strut are supported on the bulkhead part via the reinforcing part, and
   wherein the steering column support strut has a first strut section that runs upwardly at an angle toward the front of the vehicle, at least in sections, starting from the steering column, and which transitions into a second strut section, which is formed by a fastening flange of the steering column support strut for connection to the reinforcing part.

9. The bearing arrangement according to the claim 8, wherein the first strut section has a kink.

10. A bearing arrangement for a steering column of a vehicle, the bearing arrangement comprising:
    a cross member running within a vehicle interior of the vehicle;
    a bulkhead part disposed in front of the cross member, viewed in a direction of travel of the vehicle;
    a cross member support strut, which supports the cross member on the bulkhead part;
    the steering column, which is supported on the cross member and supported on the bulkhead part with the aid of a steering column support strut; and a reinforcing part fastened to the bulkhead part on an interior side of the vehicle, wherein the cross member support strut and the steering column support strut are supported on the bulkhead part via the reinforcing part, and wherein the reinforcing part is formed by a hollow profile.

11. The bearing arrangement according to the claim 10, wherein the hollow profile is formed by a U profile, viewed in cross-section, which, together with the bulkhead part, forms a closed hollow profile, viewed in cross-section.

\* \* \* \* \*